March 6, 1934.  R. MERKEL  1,949,546
GEAR CUTTING MACHINE
Filed Dec. 26, 1931
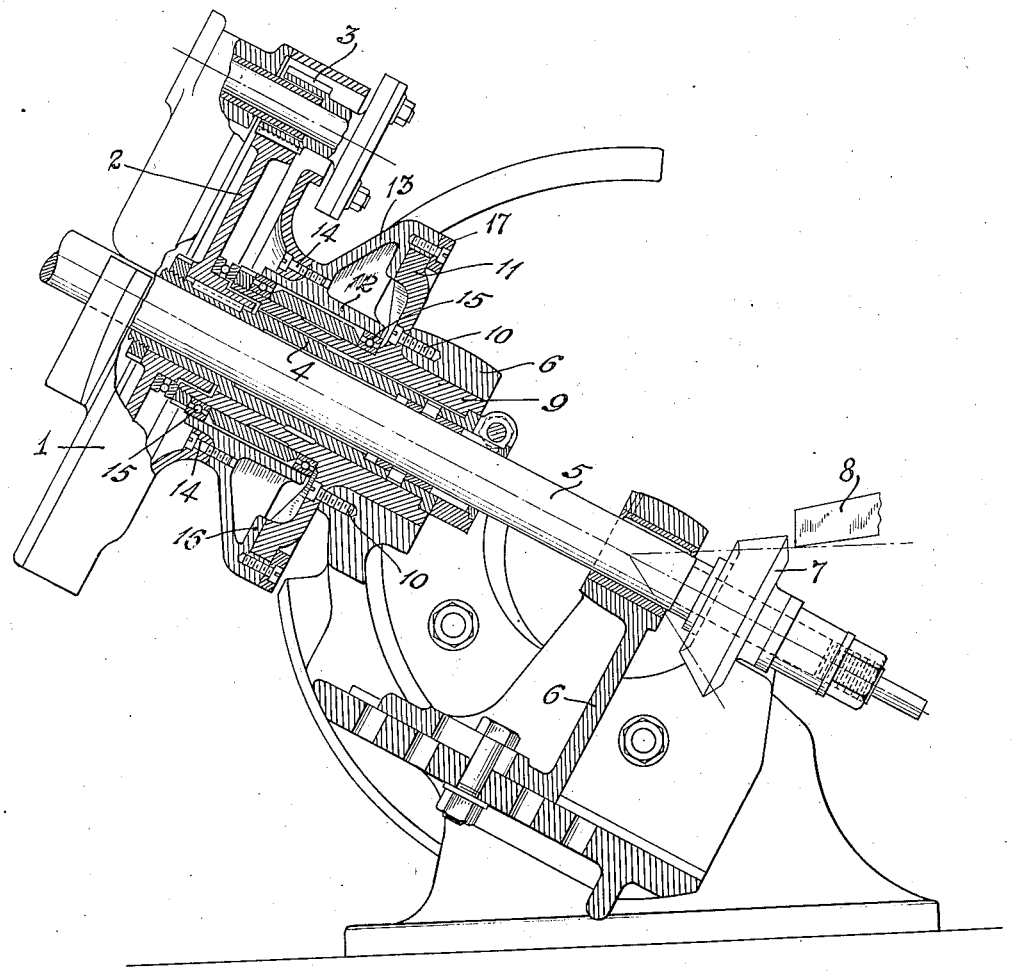
INVENTOR
ROBERT MERKEL
BY Joseph Hirschman
ATTORNEY Patented Mar. 6, 193

1,949,546

UNITED STATES PATENT OFFICE 1,949,546

GEAR-CUTTING MACHINE

Robert Merkel, Chemnitz, Germany, assignor to J. E. Reinecker, A. G., Chemnitz, Germany Application December 26, 1931, Serial No. 583,162

4 Claims. (Cl. 90—9)

My invention relates to gear cutting machines, particularly of the Bilgram type (see Reissue Patent No. 13,502, Dec. 31, 1912), and has for its object to produce an improved gear cutting machine, for straight, spiraloid and hypoid teeth, which is substantially free of vibration in operation and is capable of producing more accurately machined gears and at a higher output than has heretofore been attained.

As heretofore constructed, the spacer housing of this type of machine, in which housing the spacer drive is journalled, runs upon two ball bearings. The play of the balls in their annular raceways produced vibrations in the spacer housing during the shaping of the work-piece, such vibration being transmitted to the shaft upon which the work-piece is mounted through the spacer drive which engages a spacer gear rigidly mounted upon such shaft. As a result, irregular, wave-like cutting of the gear teeth occurred.

According to the invention, the spacer housing is provided with a guiding mechanism which simultaneously acts as a thrust and radial bearing, so that axial and radial movements of such housing are practically eliminated.

It is also an object of the invention to provide an improved guiding and bearing structure for the spacer housing of gear cutting or shaping machine which is simple in construction, reliable in operation, and inexpensive to manufacture.

My invention is illustrated by way of example on the accompanying drawing, which represents a central sectional view, partly in elevation, of my improved gear cutting machine.

The numeral 1 indicates the spacer head housing within which is positioned the spacer gear 2 driven intermittently by a pinion 3 in known manner. The gear 2 is keyed to a sleeve 4 which is clamped or otherwise removably secured to the shaft 5 supported upon two arms 6 of the frame of the machine. Upon the shaft 5 is mounted the work-piece 7 which is intermittently rotated in step-by-step fashion and engaged at the proper instants by the cutter 8 according to a predetermined plan. As the mechanisms for operating the spacer gear 2 and cutter 8 are well understood in the art and form no part of the present invention, they have not been illustrated on the drawing.

The sleeve 4 rotates within a bushing 9 which is secured to the left arm 6 of the machine frame, as by means of screws 10, and thereby held against rotation. The bushing 9 is provided with a circular flange 11 whose outer end portion is carefully machined to provide smooth bearing surfaces. A bearing element composed of an annular portion 12 and an angularly projecting portion 13 surrounds the bushing 9 and is secured, as by means of screws 14, to the spacer head and rotates therewith. Two ball bearings 15 are positioned between the element 12 and bushing 9.

The circular flange 11 and the portion 13 are provided in accordance with the present invention to furnish additional bearing surfaces for the spacer head, and particularly thrust bearings, whereby vibrations and other undesirable disturbances are eliminated, so that the cutter 8 cuts smoothly and accurately. The angular portion 13 engages the periphery of the flange 11 and is provided with an inwardly extending web 16 which engages one side of the flange 11. A ring 17 is screwed or otherwise secured to the portion 13 and is arranged to engage the opposite side of the flange 11. It will thus be seen that the bearing element 12, 13 and hence the spacer head 1, are so associated with the fixed bushing and flange 9, 11 through the ball bearings 15 and the sliding bearings formed by the parts 13, 16, 17, 11, that not only is friction between the relatively moving parts reduced to a minimum, but the parts 12, 13 and 1 are effectively held against radial and axial movement, particularly in view of the extended bearing surfaces offered by the flange 11, which is of considerably larger diameter than the bushing 9.

It will be evident that the circular flange 11 need not be integral with the annular bushing 9; such flange and bushing may be made of separate parts and may be separately fixed to the support 6.

Because of its substantial freedom from vibration, my improved machine can be operated at considerably higher speeds than known machines, so that its output is proportionately greater. Moreover, the pressure of the steel upon the flank of the tooth being cut is much less and is more uniform than heretofore, while the formation of wave-like traces upon the teeth flanks is eliminated. In addition, fewer shaping cuts are necessary with my improved machine for finishing a gear wheel.

It will be understood that my invention may be applied to machines for cutting spiraloid and hypoid as well as straight teeth.

Variations from the specific form of the invention described and illustrated may be resorted to within the scope of the appended claims without departing from the spirit of the invention.

I claim:

1. In a gear cutting machine, the combination of a support, an annular bushing fixed to said support, a work-piece supporting shaft positioned within said bushing, a spacer housing geared to said shaft, a bearing between said housing and bushing, and a second bearing for said housing separate of said annular bushing for guiding said housing, said second bearing being provided with two contact surfaces, one concentric with the shaft and the other transverse thereto, whereby said housing is held against radial and axial vibrations.

2. In a gear cutting machine, the combination of a support, an annular bushing fixed to said support, a work-piece supporting shaft positioned within said bushing, a spacer housing geared to said shaft, a bearing between said housing and bushing, and a second bearing for said housing separate of said annular bushing for guiding said housing, said second bearing comprising a projecting portion attached to the housing, and a flange member secured to the support.

3. In a gear cutting machine, the combination of a support, an annular bushing fixed to said support, a work-piece supporting shaft positioned within said bushing, a spacer housing geared to said shaft, a bearing between said housing and bushing, and a second bearing for said housing separate of said annular bushing for guiding said housing, said second bearing comprising a projecting portion attached to the housing, and a flange member secured to the support, said portion engaging said member along at least two surfaces of the latter.

4. In a gear cutting machine, the combination of a support, an annular bushing fixed to said support, a work-piece supporting shaft positioned within said bushing, a spacer housing geared to said shaft, a bearing between said housing and bushing, and a second bearing for said housing separate of said annular bushing for guiding said housing, said first-mentioned bearing including a sleeve fixed to the spacer housing, said sleeve having a portion projecting outwardly therefrom, a flange secured to said bushing, the outer sections of said projecting portion and flange being in engagement and providing said second bearing.

ROBERT MERKEL.